April 21, 1953 H. HORNSCHUCH 2,635,902
SEALING MEANS
Filed Oct. 16, 1948
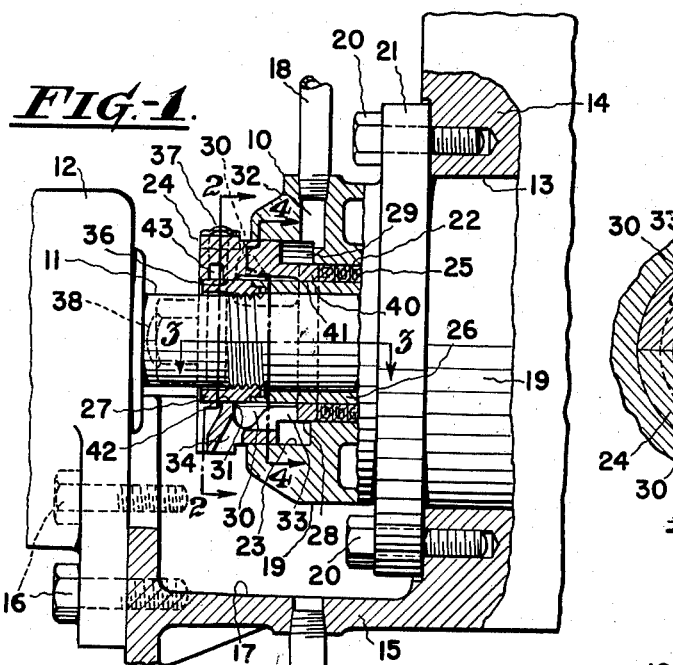
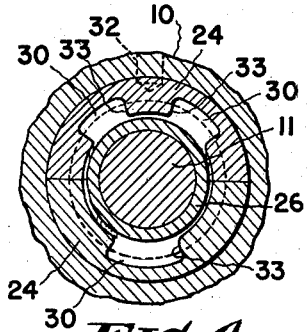
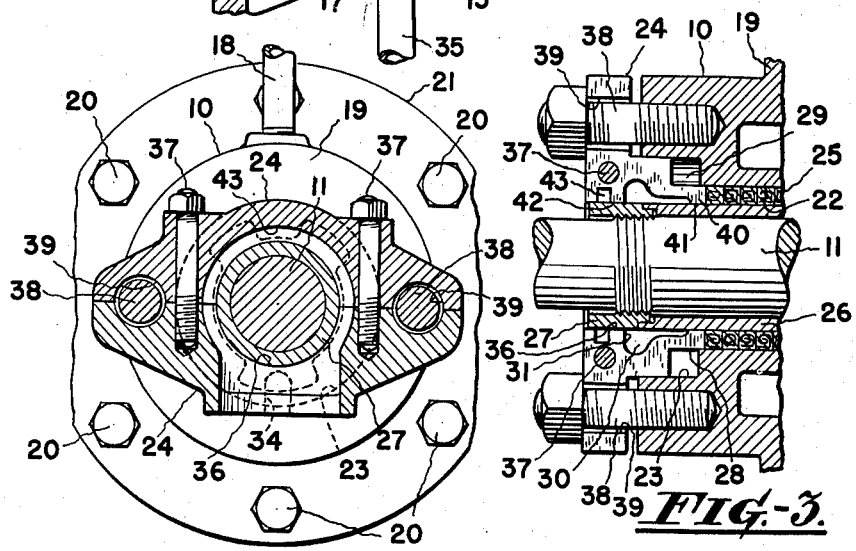
INVENTOR
HANNS HORNSCHUCH
BY
HIS ATTORNEY Patented Apr. 21, 1953

2,635,902

UNITED STATES PATENT OFFICE 2,635,902

SEALING MEANS

Hanns Hornschuch, Easton, Pa., assignor to Ingersoll-Rand Company, New York, N. Y., a corporation of New Jersey Application October 16, 1948, Serial No. 54,903

1 Claim. (Cl. 286—8)

This invention relates to a sealing means, and more particularly to a seal for rotating shafts.

As is well known to those familiar with the art, one disadvantage generally associated with seals of this type is that any leakage of fluid along the sealing material to the exterior of the seal eventually finds its way to the shaft and is thrown on the surrounding machinery. And, further, in instances where a pressure differential exists across the seal, and in other obvious examples, hot fluid being pumped escapes along the seal and flashes into vapor in the atmosphere and then condenses on surrounding machinery. This is, of course, a very undesirable condition, and it is accordingly one object of the invention to collect any leakage of fluid or vapor along the exterior of the packing or sealing material of the seal and to conduct such leakage to a remote point for disposal.

Another object of the invention is to trap and collect any leakage of fluid or vapor along the inner periphery of the packing, or along the shaft, and A further object of my invention is to condense such leakage vapors.

Other objects will become apparent hereinafter.

In the drawing accompanying this specification and in which similar reference characters refer to similar parts, Figure 1 is a longitudinal elevation, partly in section, of a sealing means constructed in accordance with the practice of the invention adapted to the shaft of a motor driven pump or a blower, a portion of which is shown, Figure 2 is a transverse view, partly in section, taken through Figure 1 along the line 2—2 of Fig. 1, looking in the direction of the arrows, Figure 3 is a view, partly in section, through the seal along the line 3—3 of Fig. 1, looking in the direction of the arrows, Figure 4 is a view in transverse section taken through Fig. 1 along the line 4—4 looking in the direction of the arrows.

Referring to the drawing, 10 designates, in general, a seal constructed in accordance with the practice of the invention mounted in an opening 13 in the casing 14 of a pump or blower or similar machine of any suitable design and encircling a shaft 11 of a motor 12 for driving the pump.

One purpose of the seal is, of course, to minimize the leakage of fluid or vapor from within the casing, and a further purpose is to collect any leakage along the shaft and the inner or outer periphery of the sealing material of the seal and to condense such vapor. Accordingly, the seal 10 is supplied with a condensing fluid, such as water, through a conduit 18 from a suitable source (not shown); and the pump frame 15 has a cup portion integral with the casing 14 and secured to the motor 12 by bolts 16 or sump 17 disposed directly below the seal 10 to collect condensing and leakage fluids from the seal.

More specifically, the seal 10, in its preferred form, includes a housing 19 mounted in the opening 13 and secured to the casing 14 by means of bolts 20 which pass through a flange 21 on the housing 19. A bore 22 in the housing 19 loosely encircles and is concentric with the shaft 11 and is adapted to contain suitable packing material 25. A counterbore 23 in housing 19 adjacent bore 22 serves as a guide for a gland 24 adapted to compress the packing 25.

A conventional shaft sleeve 26 is interposed between the sealing material 25 and the shaft 11 to assure a better sealing relation between the sealing material and the materials against which it bears and to avoid wear on the shaft. A nut 27 threaded on the shaft 11 bears against the outer end of the sleeve 26 to hold the sleeve in frictional engagement with the shaft 11. An annular groove 28 provided in the outer periphery of the inner end portion of the gland 24 cooperates with the surfaces bounding the enlarged bore 23 to form a chamber 29 that serves to collect any leakage of fluid or vapor past the packing material 25. The chamber 29 communicates with the conduit 18 through a passage 32 in the housing 19 and, in this manner, a fluid, such as water, is available to condense the previously mentioned vapor in order to prevent its escape from the seal to contaminate the air or condense on or in the motor 12.

A chamber 30 is formed within the gland 24 by a groove 31 in the inner periphery of the gland intermediate its ends. The leak chamber 30, so positioned, serves to trap and collect any leakage of fluid or vapor from the interior of the casing 14 along the outer periphery of the sleeve 26 or inner surface of the sealing material 25. Such vapors are, as in the chamber 29, condensed by the fluid delivered to the seal through the conduit 18 and to this end, openings 33 are provided in the gland 24 to communicate the chamber 30 with the chamber 29. The condensing fluid and the condensate are then drained from chamber 30 through a passage 34 in the lower portion of the gland 24 into the sump 17 and thence to a point remote from the pump through a conduit 35 threaded in the bottom of the pump frame 15.

With this gland construction, it will be noted, that longitudinally disposed surfaces 41 and 42 are provided on the gland 24 at the opposite ends of the chamber 30, which bear against the sleeve 26, thus precluding any possibility of cocking the gland 24.

To insure against the possibility of fluid leaking from the leak chamber 30 along the sleeve 26 and splashing against the motor 12 or any other associated mechanisms, a skirt or guard 36 is provided at the outer end of the gland 24 which is in sealing contact with the upper and side portions of the outer periphery of the sleeve 26, thereby defining a groove 43 that partially encircles the sleeve 26 and, at its lower portion, opens into the sump 17—thus, any fluid leaking from the chamber 30 will be conducted into the sump 17.

In the form of the invention shown, the gland 24 is of split construction to facilitate mounting of the gland on the shaft 11 and is, accordingly, held in its assembled relation by bolts 37; and bolts 38 are provided which pass through openings 39 in the gland and thread in the housing 19 for imparting longitudinal movement to the gland to control the pressure exerted on the packing 25 by the reduced end portions 40 of the gland.

It is now obvious from the previous description, that a sealing means constructed in accordance to the practice of the invention obviates any possibility of fluid, such as oil, leaking from the pump or other mechanisms to which the seal is adapted, to contaminate the air or to accelerate the deterioration of the prime mover—for example, oil splashed on the interior of an electric motor would cause rapid deterioration of the insulation.

While I have shown and described a specific form of my invention, it is to be understood that various changes and modifications may be made without departing from the spirit of the invention as set forth in the appended claim.

I claim:

A sealing device for a rotating shaft comprising a housing having an opening therein, a rotating shaft in the opening, sealing means between the shaft and the housing, a gland for pressing the sealing means into sealing contact with the shaft and the housing and having an outer peripheral surface co-operating with the opening to form an annular chamber adjacent the outer surface of the sealing means to collect any leakage of fluid along the outer surface of the sealing means, a groove in the inner periphery of the gland for collecting any leakage of fluid along the shaft, a conduit for conveying condensing fluid to the annular chamber and the groove, and a second groove in the inner periphery of the gland positioned immediately adjacent to and outwardly from the first mentioned groove for collecting the condensing fluid leaking outwardly along the shaft.

HANNS HORNSCHUCH.

References Cited in the file of this patent

UNITED STATES PATENTS

| Number | Name | Date |
| --- | --- | --- |
| 216,038 | Hewitt | June 3, 1879 |
| 448,874 | Brewer | Mar. 24, 1891 |
| 691,893 | Butler et al. | Jan. 28, 1902 |
| 775,910 | Backstrom | Nov. 29, 1904 |
| 1,124,514 | Platt | Jan. 12, 1915 |
| 1,248,397 | Pinkney | Nov. 27, 1917 |
| 1,677,780 | Jaworowski | July 17, 1928 |
| 1,795,311 | Meyer | Mar. 10, 1931 |
| 1,943,578 | Bigelow et al. | Jan. 16, 1934 |
| 2,368,962 | Blom | Feb. 6, 1945 |

FOREIGN PATENTS

| Number | Country | Date |
| --- | --- | --- |
| 527,640 | Great Britain | of 1940 |